(12) United States Patent
Krueger

(10) Patent No.: US 11,479,389 B2
(45) Date of Patent: Oct. 25, 2022

(54) TAMPER EVIDENT PLASTIC FOOD CONTAINER

(71) Applicant: Anchor Packaging, LLC, St. Louis, MO (US)

(72) Inventor: Kevin Krueger, Fenton, MO (US)

(73) Assignee: Anchor Packaging, LLC, St. Louis, MO (US)

( * ) Notice: Subject to any disclaimer, the term of this patent is extended or adjusted under 35 U.S.C. 154(b) by 192 days.

(21) Appl. No.: 16/879,123

(22) Filed: May 20, 2020

(65) Prior Publication Data

US 2021/0362914 A1  Nov. 25, 2021

(51) Int. Cl.
*B65D 43/16* (2006.01)
*B29D 22/00* (2006.01)
*B65D 55/02* (2006.01)

(52) U.S. Cl.
CPC ......... *B65D 43/162* (2013.01); *B29D 22/003* (2013.01); *B65D 55/024* (2013.01); *B65D 2543/00185* (2013.01); *B65D 2543/00296* (2013.01); *B65D 2543/00351* (2013.01); *B65D 2543/00462* (2013.01);
(Continued)

(58) Field of Classification Search
CPC ...... B65D 55/024; B65D 17/32; B65D 17/40; B65D 43/162; B65D 2401/60; B65D 2543/0049; B65D 2543/00537; B65D 2543/00555; B65D 2543/00685; B65D 2543/00833; B65D 2543/0012; B65D 2543/00351; B65D 2543/00453; B65D 2543/00657; B65D 2543/00768; B65D 2543/00796; B65D 2543/00842; B65D 43/0266; B65D 2203/00; B65D 2543/00296; B65D 2543/00101; B65D 2543/00222; B65D 2543/00361; B65D 2543/00379; B65D 2543/0062;
(Continued)

(56) References Cited

U.S. PATENT DOCUMENTS 2,915,214 A  12/1959 Frankel
4,128,808 A  12/1978 Westra
(Continued)

FOREIGN PATENT DOCUMENTS

EP  1695919  8/2006
EP  2210819  6/2012
(Continued)

*Primary Examiner* — Valentin Neacsu
*Assistant Examiner* — John Martin Hoppmann
(74) *Attorney, Agent, or Firm* — Armstrong Teasdale LLP

(57) ABSTRACT

The tamper evident container includes a base with a base hinge panel and a lid with a lid hinge panel. A hinge connects the panels. A frangible line extends from an edge of the lid hinge panel to a first point on the panel and then outwardly to the hinge. The frangible line crosses the hinge and extends inwardly to a second point on the base hinge panel. From the second point the frangible line extends to an edge of the base hinge panel. When the container is initially sealed, the frangible line separates upon the application of an upwardly directed force to a first portion of the lid hinge panel while a second portion of the lid hinge panel is held in a fixed position or moved downwardly. The separation of the frangible line creates two grasping portions that can be used to pull the lid from the base.

20 Claims, 16 Drawing Sheets

(52) U.S. Cl.
CPC .............. *B65D 2543/00657* (2013.01); *B65D 2543/00685* (2013.01); *B65D 2543/00768* (2013.01); *B65D 2543/00796* (2013.01); *B65D 2543/00842* (2013.01)

(58) Field of Classification Search
CPC .......... B65D 2543/00731; B65D 11/24; B29D 22/003; B29L 2031/7162; B29C 51/00
USPC ....... 220/270, 790, 266, 839, 265, 269, 377, 220/675; 229/406; D9/416, 429
See application file for complete search history.

(56) References Cited

U.S. PATENT DOCUMENTS

| | | | |
|---|---|---|---|
| 4,273,249 A | 6/1981 | Florian | |
| 5,242,696 A | 9/1993 | McDevitt | |
| 5,897,011 A | 4/1999 | Brilliant | |
| 5,938,068 A | 8/1999 | Atkins | |
| 6,135,304 A | 10/2000 | Wyslotsky | |
| 6,572,909 B1 | 6/2003 | Bagwell et al. | |
| 7,073,680 B2 | 7/2006 | Boback et al. | |
| 7,118,003 B2 | 10/2006 | Sellari et al. | |
| 7,246,714 B2 | 7/2007 | Garg et al. | |
| D585,735 S | 2/2009 | Vovan | |
| D587,993 S | 3/2009 | Golota | |
| 7,568,589 B2 | 8/2009 | Vovan | |
| 7,631,776 B2 | 12/2009 | Vovan | |
| 7,685,677 B2 | 3/2010 | Garg et al. | |
| 7,712,626 B2 | 5/2010 | Vovan | |
| 7,992,743 B2 | 8/2011 | Vovan | |
| 8,056,750 B2 | 11/2011 | Vovan | |
| 8,083,089 B2 | 12/2011 | Vovan | |
| 8,123,064 B2 | 2/2012 | Vovan | |
| 8,251,249 B1 | 8/2012 | Vovan | |
| 8,371,468 B2 | 2/2013 | Sellari et al. | |
| D693,672 S | 11/2013 | Bontrager et al. | |
| 8,608,608 B1 | 12/2013 | Gingras et al. | |
| D698,241 S | 1/2014 | Fosse | |
| 8,672,166 B2 | 3/2014 | Nazareth et al. | |
| 8,757,416 B2 | 6/2014 | Golota | |
| 8,795,580 B2 | 8/2014 | Sellari et al. | |
| 8,833,589 B2 | 9/2014 | Vovan | |
| 8,851,315 B2 | 10/2014 | Vovan | |
| 8,939,307 B2 | 1/2015 | Gingras et al. | |
| 9,016,503 B2 | 4/2015 | Barbier | |
| 9,120,595 B2 | 9/2015 | Chou | |
| 9,132,942 B2 | 9/2015 | Nikaein | |
| 9,216,849 B2 | 12/2015 | Pham et al. | |
| 9,365,331 B2 | 6/2016 | Gingras et al. | |
| 9,409,683 B2 | 8/2016 | Gingras et al. | |
| 9,475,621 B1 | 10/2016 | Krueger et al. | |
| 9,493,277 B2 | 11/2016 | Parikh et al. | |
| 9,527,633 B2 | 12/2016 | Chen | |
| 9,527,640 B2 | 12/2016 | Sellari et al. | |
| 9,580,219 B2 | 2/2017 | Cimmerer et al. | |
| 9,624,009 B2 | 4/2017 | Gingras et al. | |
| 9,630,756 B2 | 4/2017 | Sellari | |
| 9,656,785 B2 | 5/2017 | Cimmerer et al. | |
| 9,676,527 B2 | 6/2017 | McCumber | |
| D795,651 S | 8/2017 | Cimmerer | |
| 9,796,511 B2 | 10/2017 | Cimmerer et al. | |
| 9,944,436 B2 | 4/2018 | Kalmanides | |
| 9,981,782 B2 | 5/2018 | Kalmanides | |
| 10,457,449 B2 | 10/2019 | Pham | |
| 10,669,078 B2 | 6/2020 | Kalmanides | |
| 11,077,991 B2 * | 8/2021 | Smith | B65D 43/0206 |
| 2004/0118848 A1 | 6/2004 | Marshall | |
| 2006/0289549 A1* | 12/2006 | Vovan | B65D 43/0254 220/791 |
| 2007/0045317 A1 | 3/2007 | Rosender | |
| 2008/0023471 A1 | 1/2008 | Garg et al. | |
| 2008/0308557 A1 | 12/2008 | Kyle et al. | |
| 2009/0090712 A1* | 4/2009 | Vovan | B65D 43/021 220/23.86 |
| 2010/0072217 A1 | 3/2010 | Parikh et al. | |
| 2010/0102074 A1 | 4/2010 | Parikh et al. | |
| 2010/0181323 A1 | 7/2010 | Thaler | |
| 2011/0000929 A1 | 1/2011 | Brown et al. | |
| 2012/0067009 A1 | 3/2012 | Bontrager et al. | |
| 2012/0181280 A1 | 7/2012 | Barbier | |
| 2012/0292322 A1* | 11/2012 | Meyer | B65D 43/0258 220/270 |
| 2013/0175280 A1 | 7/2013 | Stodd | |
| 2014/0069922 A1 | 3/2014 | Boback et al. | |
| 2016/0016707 A1 | 1/2016 | Sellari et al. | |
| 2016/0185490 A1 | 6/2016 | Wang | |
| 2018/0118421 A1* | 5/2018 | Allers | B65D 43/0254 |
| 2019/0119017 A1 | 4/2019 | Landan et al. | |
| 2019/0185221 A1* | 6/2019 | Allers | B65D 43/0256 |
| 2019/0276192 A1* | 9/2019 | Kalmanides | B65D 43/0241 |
| 2019/0337663 A1 | 11/2019 | Knutson et al. | |

FOREIGN PATENT DOCUMENTS

| | | | |
|---|---|---|---|
| EP | 2580138 | 4/2014 | |
| EP | 3476763 A1 * | 5/2019 | ......... B65D 43/0235 |
| GB | 2412651 A * | 10/2005 | ......... B65D 43/0272 |
| WO | WO2003022703 | 3/2003 | |
| WO | WO2005009857 | 2/2005 | |
| WO | WO2005056414 | 6/2005 | |
| WO | WO2006119538 | 11/2006 | |
| WO | WO2008008343 | 1/2008 | |

* cited by examiner

TAMPER EVIDENT PLASTIC FOOD CONTAINER

CROSS REFERENCE TO RELATED APPLICATION

Not applicable.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

This invention relates generally to plastic food containers. The invention is more specifically related to re-closable plastic food containers having tamper evident sealing mechanisms.

BACKGROUND OF THE INVENTION

It is known to use plastic containers in the food preparation and restaurant industry to package prepared foods. The typical food container of the prior art consists of a clear or solid colored base and a clear lid. In order to maintain the quality of food contents and prevent tampering with the contents of a sealed container, it is desirable that the food container, once initially sealed, not be capable of being initially opened without visible indication of the container having been opened. To achieve this feature, container manufacturers have designed plastic containers having integral tamper evident features. Typically, these containers consist of a lid that is hingedly attached to a base. The lid seals to the base by superposing the rim of the lid upon the rim of the base. These types of plastic containers are sold as one-piece containers and are often referred to as "clamshell" containers or packages.

In one type of hinged tamper evident container, the lid and base each have interlocking elements respectively located on or near the lid rim and base rim where the two rims meet when the container is sealed (i.e., at a non-hinged side or portion of the container). The interlocking element of the lid or base is conventionally located on a tab or flange extending from the rim of the lid or base. Either or both of the tabs are attached to their respective rims by a frangible section of plastic. When the lid and base are placed in initial sealing arrangement, the interlocking elements on or near the lid rim and base rim engage and lock together. In order to open the initially sealed container, the frangible section of one or both tabs must be ruptured so as to release the tab or tabs from the container. Because the interlocking sealing elements are located on the tabs, rupturing one or more tabs from the container disables the locking mechanism. The ruptured tab provides evidence of the container having been opened.

One shortcoming with the prior art food container described above is that the interlocked tabs can be cut from the container in clean fashion using scissors or another cutting implement so as to remove any indicia of the container having had a tamper evident mechanism. In view of the issues presented by incorporating a tamper evident mechanism in the meeting rims of the hinged container, some manufacturers have incorporated tamper evident features as part of the structure that forms or includes the hinge. In these containers, the container is designed to require a severance near the hinge in order to unseal (initially open) the container. This construct makes the hinge a single use hinge.

A variety of designs are known for tamper evident food containers that have, as an initial container opening mechanism, a frangible hinge structure. Virtually all of these designs rely on the container having a specific, noticeable structure (e.g., a tab) projecting outwardly from the container to serve as a grasping or pinching platform. That grasping or pinching platform exists for purposes of the user applying a tearing force to the container to either rupture a frangible (a/k/a "weakened" or "breakable") line or remove a strip of material from the container. In certain cases, the tab is built as a separate structure departing at a distinct angle from other structure of container. In other cases, the tab is a visibly oversized portion of existing structure of the container, typically a flange of the lid or base rim, that extends beyond an opposing similar structure on the lid or base rim to provide a dedicated grasping platform. Examples of these types of design can be seen in U.S. Pat. Nos. 9,944,436, 9,676,527, 9,493,277, 9,365,331, 9,132,942 and 7,568,589. Tamper evident containers that eschew including visible tabs as grasping portions near the hinge area, generally have square-shaped or "boxy" hinge structures that require a significant vertical separation between the hinge structures emanating from the lid rim and those emanating from the base rim.

One problem with all of the foregoing designs is that a significant amount of additional material beyond a simple hinge structure is required to construct a reliably performing frangible hinge section that can be used to initially open the sealed container. In addition, many of the hinge structures or their frangible mechanisms are made using a complex arrangement of material folds and cutouts that are manufacturable only with complex tooling or forming machinery. There is thus a need in the art for a re-closable plastic food container that: is easy for end consumers to operate; combines reliable tamper evidence and defense against prying intrusion; and that uses a minimum of material to manufacture.

SUMMARY OF THE INVENTION

The present invention satisfies the needs in the art and provides an aesthetically appealing food container that is tamper resistant, tamper evident and easy to use. In this respect the present invention food container comprises a plastic food container that when viewed from the top, bottom, front, back, left side or right side, is tab-less in that it contains no visibly extraneous or extra structure to serve as a grasping portion. The container and its novel hinge area construct have a simple and clean appearance and other than the inclusion of a frangible line in the hinge panels, gives no indication of it having a tamper evident character. Thus, as opposed to the prior art containers with over-built hinge area structures, the container of the instant invention eliminates the obvious added tabs, complicated hinge area structures and a large vertical span at the hinge end.

There are several embodiments to the invention, which are broadly described in this summary section and more specifically described in the detailed description of the invention. The invention is directed to a tamper evident container having the novel hinge structure, the hinge structure, the frangible line and methods of forming the foregoing items.

In one embodiment the invention is directed to a tamper evident container comprising a base and a lid. The base includes a base rim and the lid includes a lid rim. The lid is mountable to the base for bringing the container to an initially sealed configuration. The initially sealed configuration is effected by engagement of the lid rim with the base rim. A base hinge panel joins to the base rim and extends outwardly therefrom. A lid hinge panel joins to the lid rim and extends outwardly therefrom. The base hinge panel and the lid hinge panel have respective first and second side edges.

The container includes a frangible line that extends: a) from the first side edge of the lid hinge panel and partially across the lid hinge panel to a first point on the lid hinge panel; b) from the first point outwardly to the hinge and then across the hinge and inwardly from the hinge to a second point on the base hinge panel; and c) from the second point partially across the base hinge panel to the second side edge of the base hinge panel. When the container is in the initially sealed configuration the frangible line separates upon the application of a first upwardly directed force to a first portion of the lid hinge panel, while a second portion of the lid hinge panel is held in a fixed position or moved downwardly. Notably, separating the frangible line creates a first grasping portion separated from a second grasping portion. The vertical displacement of the first grasping portion relative to the second grasping portion results in disengagement of the engaged rims.

Unlike most tamper evident containers, the inventive container when placed in the initially sealed configuration has no structures projecting outwardly of the engaged lid and base rims other than the lid hinge panel, the base hinge panel and the hinge. In fact, the construct of the frangible line operates so reliably and easily, the container can be made with no other frangible line on the lid hinge panel, the base hinge panel or the entire container. Unlike other tamper evident containers, separating the inventive frangible line does not create pieces of material detached from the container, such as tear strips, which often end up not being recycled with the rest of the container or which can serve as swallowing or choking hazards for small children and animals.

The invention is also directed to a method of thermoforming a tamper evident container comprising forming a lid from a portion of a single sheet of preferably at least partially transparent plastic material. The lid has a lid rim. A base is formed from a portion of the single sheet. The base includes a base rim defining a periphery of the base. A foldable section of the container is formed from a portion of the single sheet. The foldable section joins the lid rim and the base rim and the foldable section includes a lid hinge panel extending from the lid rim to a hinge, a base hinge panel extending from the base rim and a hinge connecting the lid hinge panel to the base hinge panel.

The method includes forming a frangible line that extends: a) from an outside edge of the lid hinge panel and longitudinally across a portion of the lid hinge panel to a first point; b) from the first point transversely across the lid hinge panel to the hinge; c) across the hinge in a manner that transects the hinge and then transversely across the base hinge panel from the hinge to a second point on the base hinge panel; and d) from the second point longitudinally across a portion of the base hinge panel to an outside edge of the base hinge panel. In a preferred embodiment the method includes forming a first arcuate segment in the frangible line on the lid hinge panel near the first point to effect transition of the frangible line from extending longitudinally on the lid hinge panel to extending transversely on the lid hinge panel. Similarly, the method can include forming a second arcuate segment in the frangible line on the base hinge panel near the second point to effect transition of the frangible line from extending longitudinally on the base hinge panel to extending transversely on the base hinge panel.

The invention is also directed to a frangible line for a plastic food container and a method for forming same. The plastic food container has a lid hinge panel connected to a lid rim, a base hinge panel connected to a base rim and a hinge connecting the lid hinge panel to the base hinge panel. The frangible line comprises: a first length extending from a first side edge of the lid hinge panel to a first point partially across the lid hinge panel; a second length extending outwardly on the lid hinge panel from the first point to the hinge and then vertically transecting the hinge and then extending inwardly from the hinge to a second point on the base hinge panel; and a third length extending from a second point on the base hinge panel to a second side edge on the base hinge panel. Rupture of the frangible line results in the creation of two adjacent grasping portions, one attached to the lid rim and one attached to the base rim. The grasping portions can be used to pull the lid off of the base. Other inventive concepts and aspects of the invention are described in detail infra.

DETAILED DESCRIPTION

Figure 1:
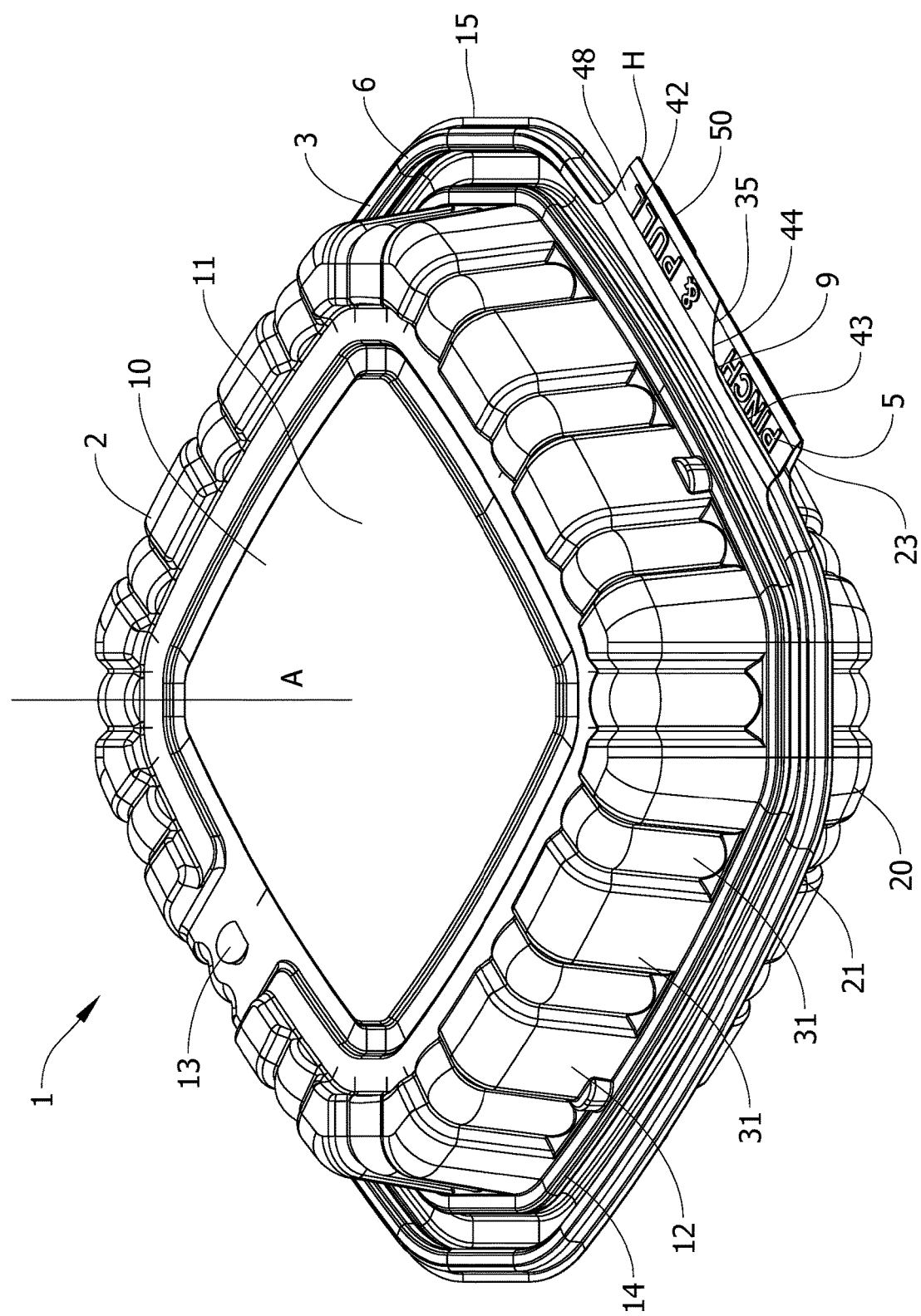
FIG. 1 is a rear perspective view of a preferred embodiment of a present invention plastic container in the initially sealed configuration.
Figure 2:
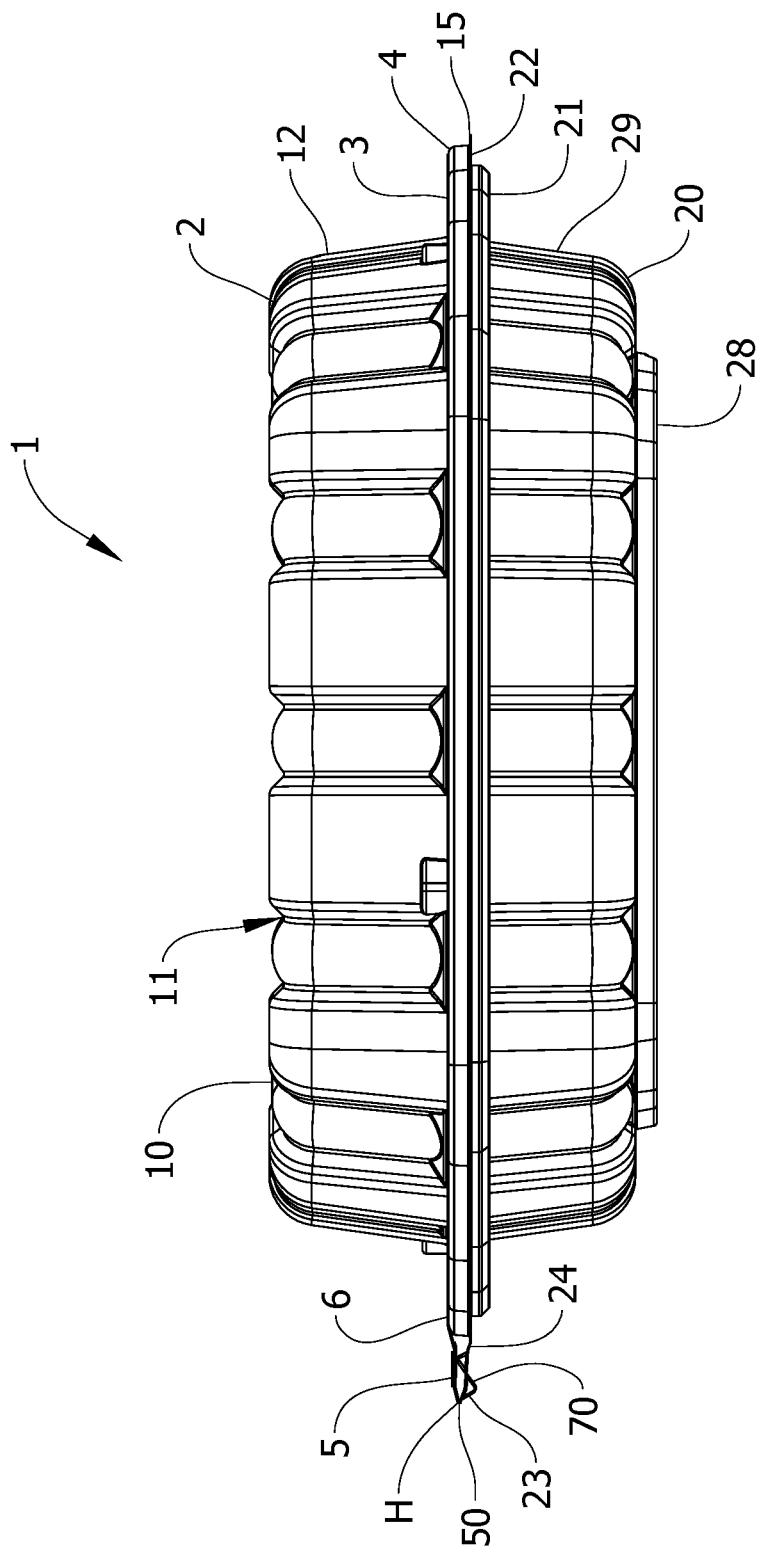
FIG. 2 is a left elevation view of the preferred embodiment container in the initially sealed configuration.
Figure 3:
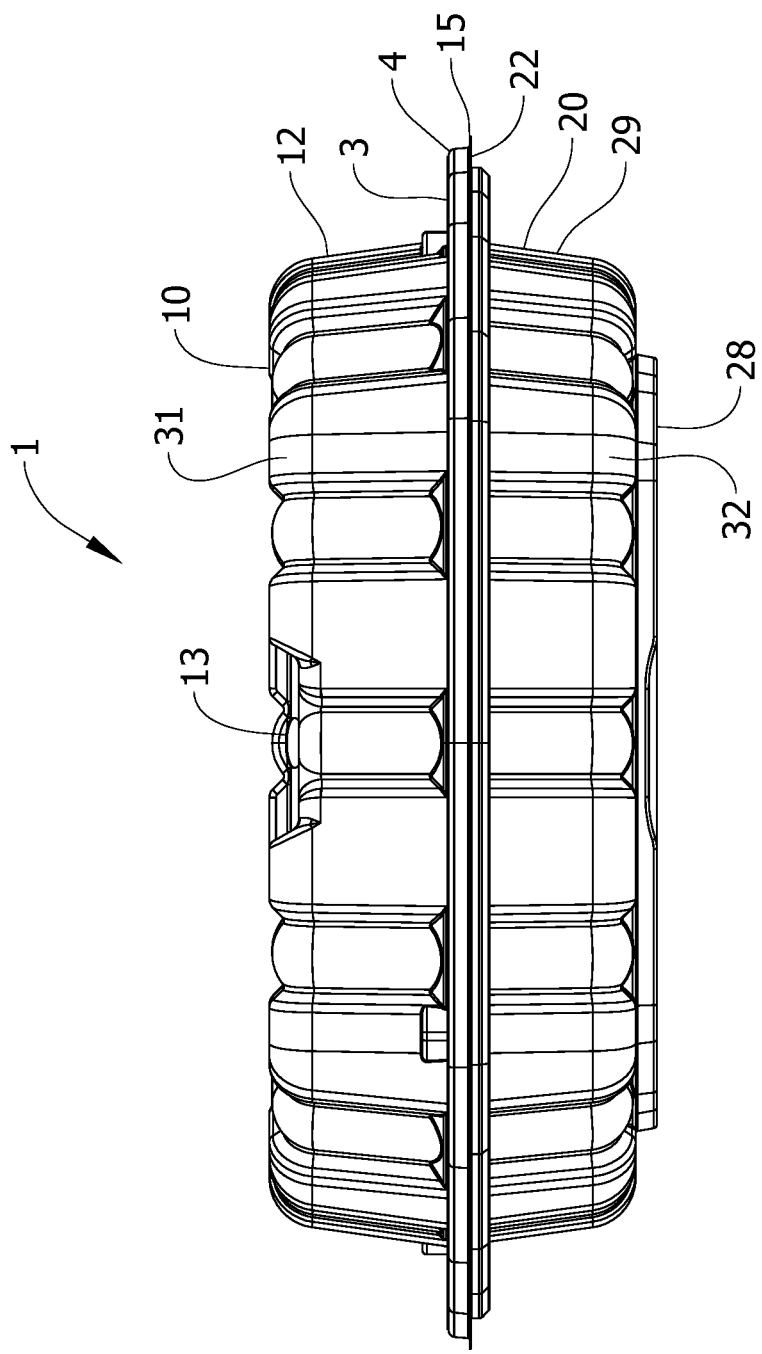
FIG. 3 is a front elevation view of the preferred embodiment container in the initially sealed configuration.
Figure 4:
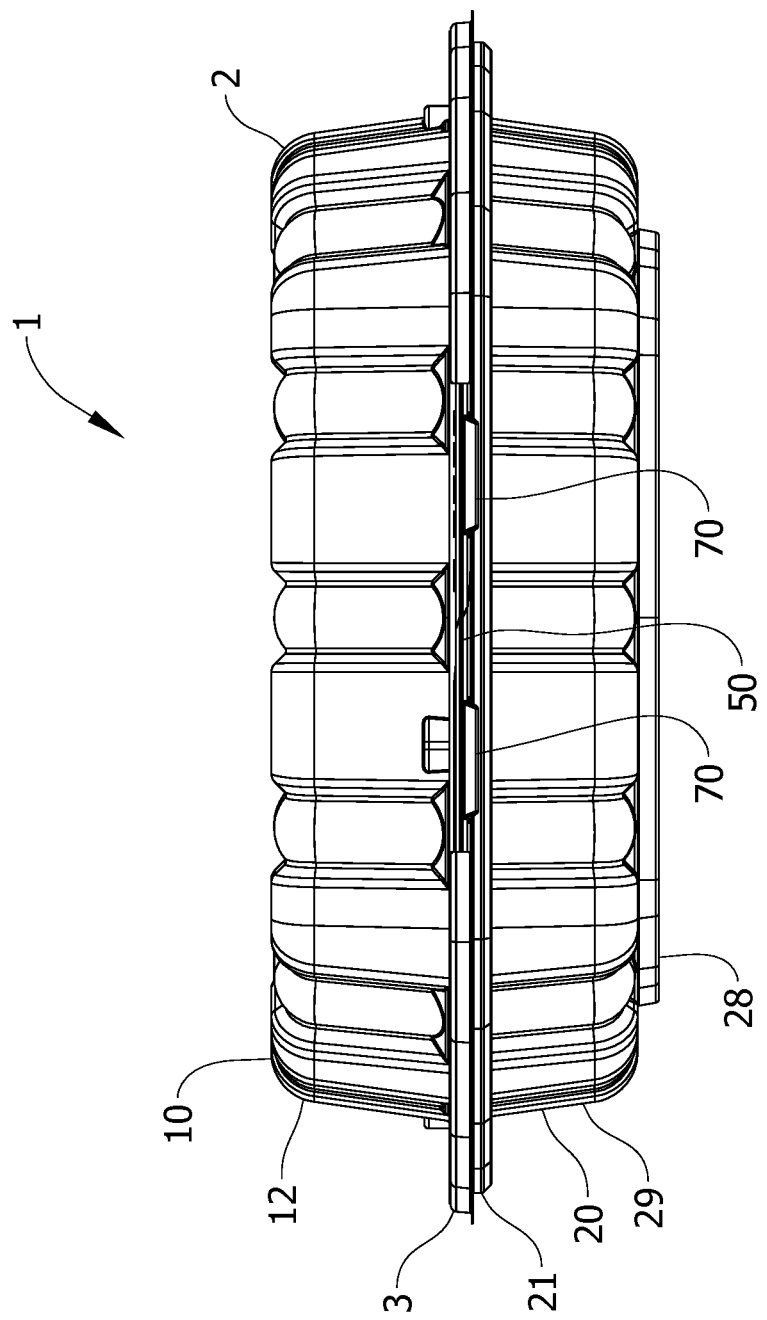
FIG. 4 is a rear elevation view of the preferred embodiment container in the initially sealed configuration.
Figure 5:
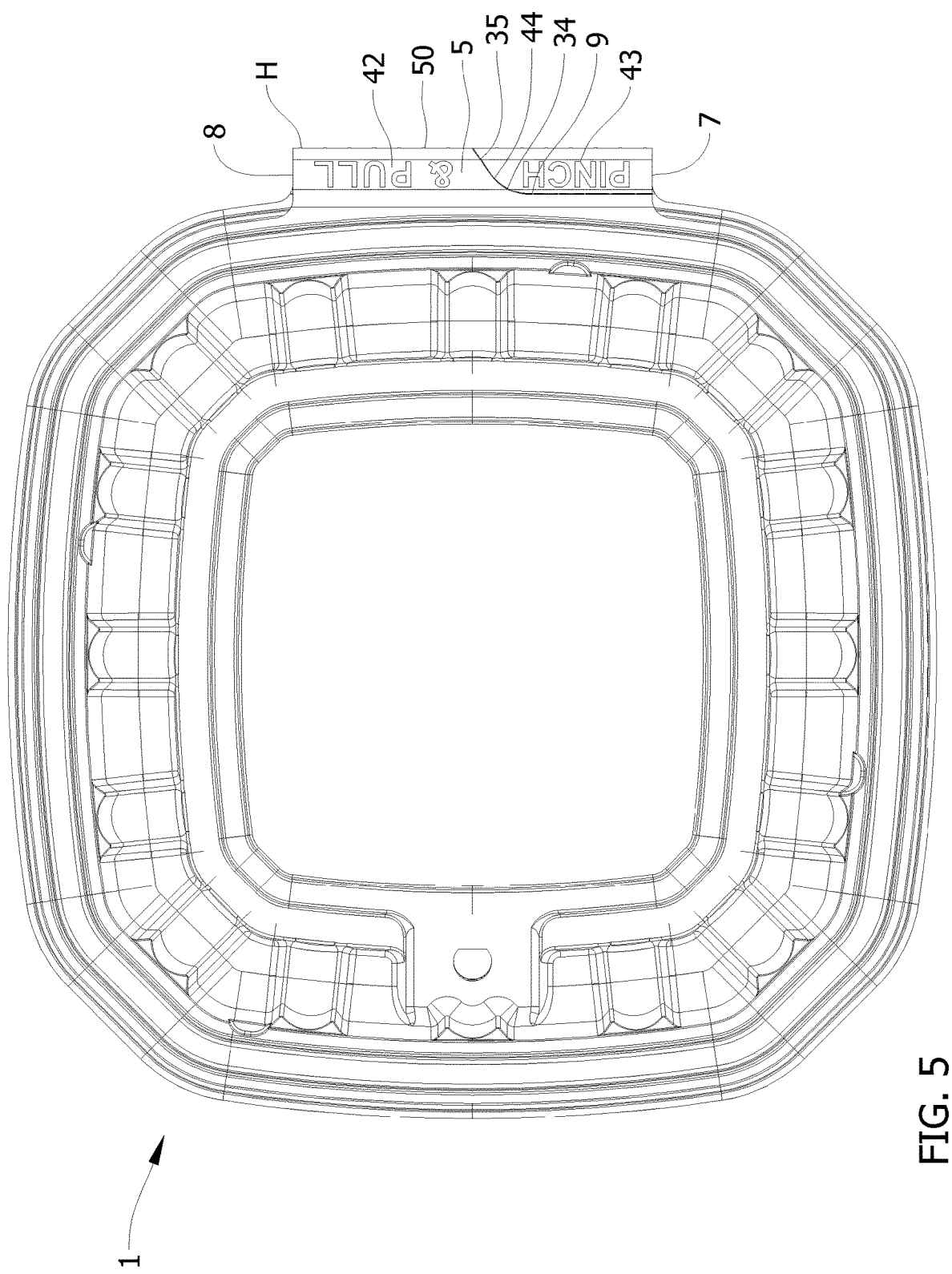
FIG. 5 is a top plan view of the preferred embodiment container in the initially sealed configuration.

FIGS. 1-16 depict a preferred embodiment present invention tamper evident plastic container 1 along with its preferred features. As is seen in the figures, the inventive container 1 includes a lid 2 and a base 20 that are attached to each other through a hinge 50 located on one side of the container. Hinge 50 includes a hinge axis H about which lid 2 and base 20 pivot (rotate). Base 20 includes floor 28. In practical use, the outer surface of floor 28 of base 20 will normally rest upon a surface (such as a table top) considered horizontal in reference to the user. Thus, the directional terms "vertical" and "horizontal" and the like are used to describe container 1 and its components with respect to the orientation and configuration illustrated in FIGS. 1-6 with the lid initially sealed upon the base and are employed merely for the purposes of clarity and illustration. For example, FIG. 1 shows container 1 from a rear perspective aspect when container 1 is in an initially sealed state. In the perspective and elevation aspects of FIGS. 1-4, lid 2 is "vertically" above base 20. The directional terms "inner" and "inwardly" and the like are used herein with respect to the described container to refer to horizontal directions along the directional component toward the geometric center of the container identified by vertical axis A representatively shown in FIG. 1. With that vertical axis as a reference, the directional terms "outer," "peripherally" and the like are used herein with respect to the described container to refer to directions along the horizontal directional component away from the geometric center of the container. Additionally, the terms "upward," "downward" and the like are used to describe spatial relationships among structure when lid 2 of container 1 is initially sealed upon the base 20.

Figure 7:
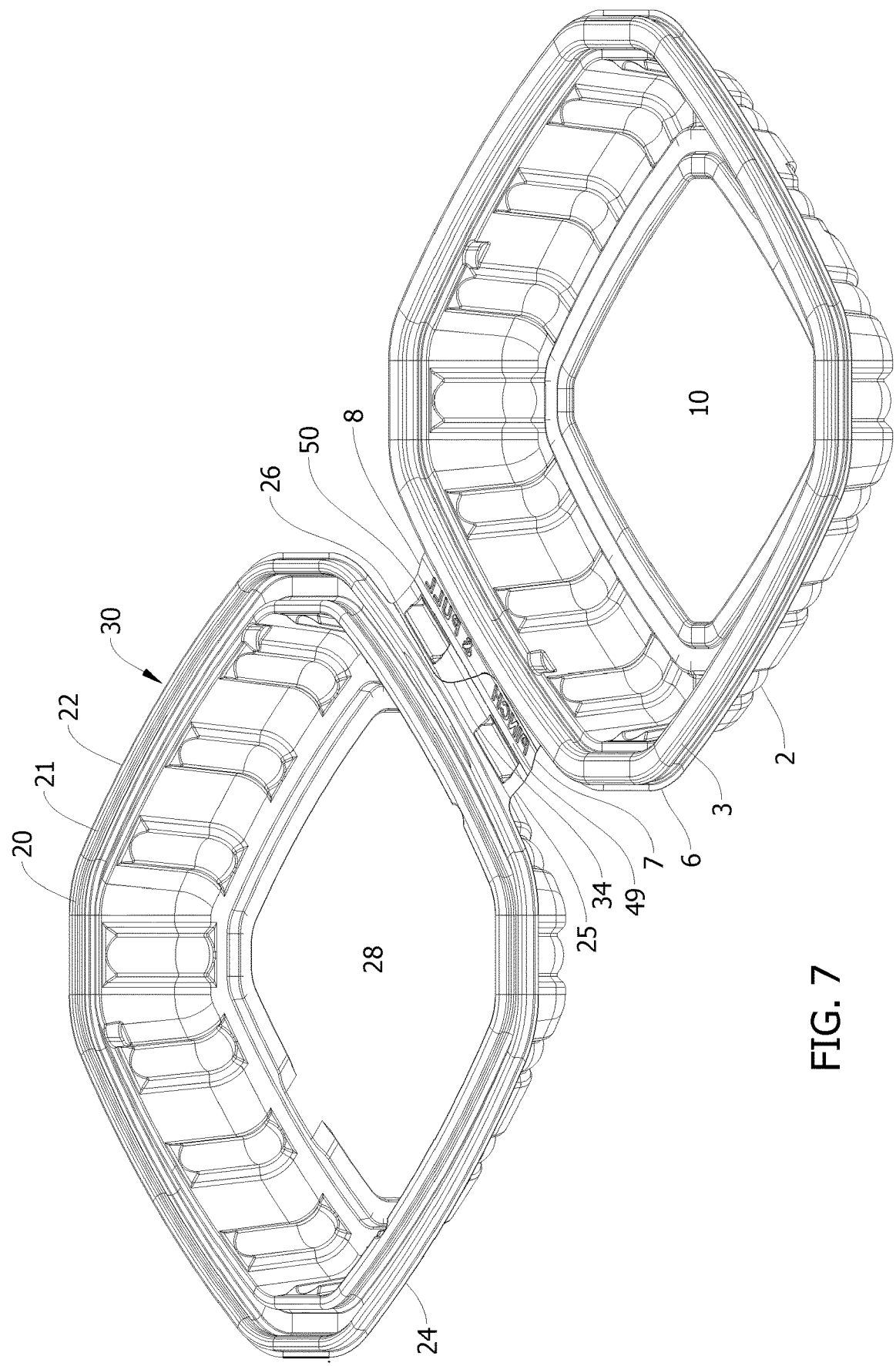
FIG. 7 is a front perspective view of a preferred embodiment of the present invention plastic container in the loading configuration.
Figure 8:
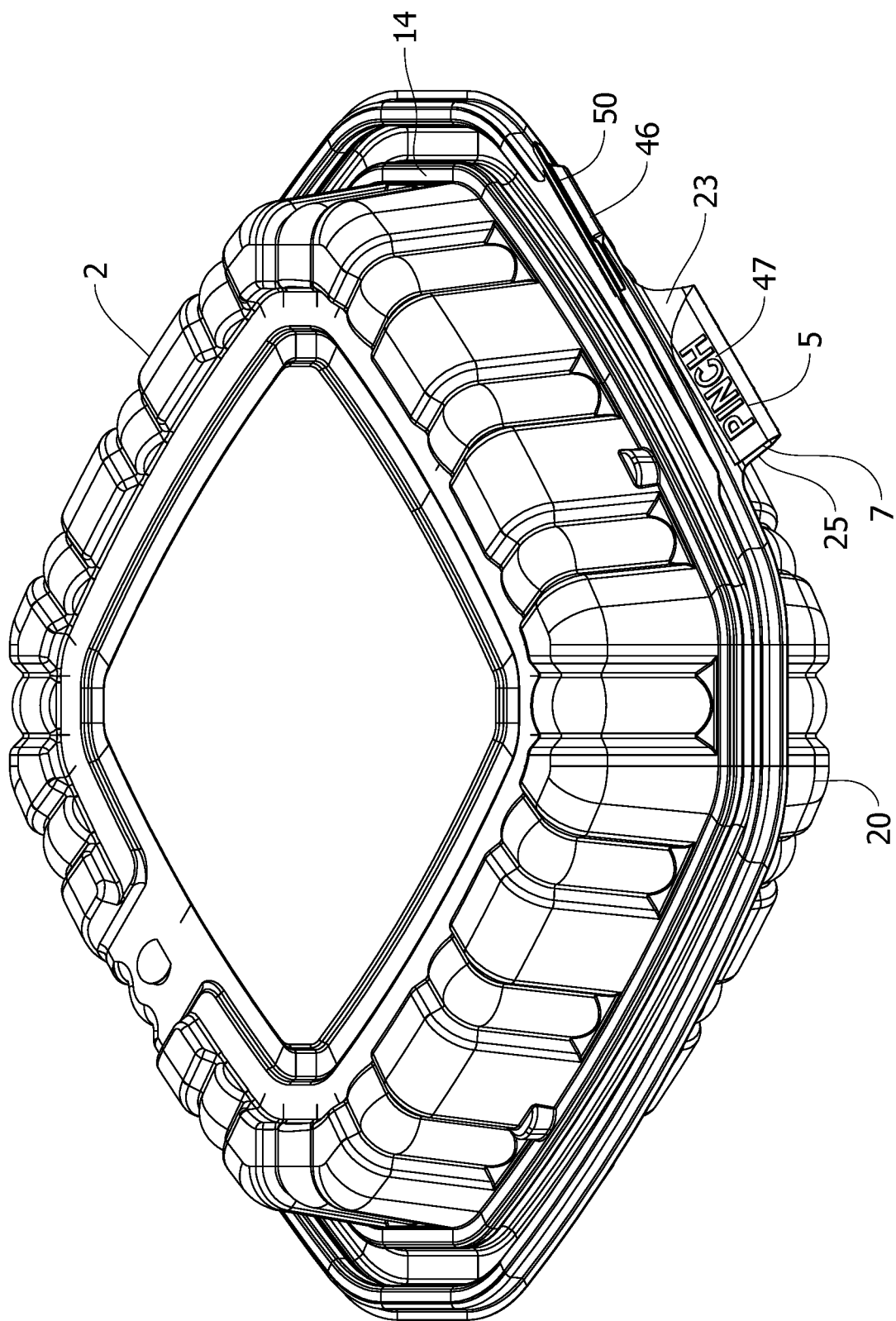
FIG. 8 is a rear perspective view of a preferred embodiment container showing the hinge area structure having been separated into two visible grasping portions that allow the lid to be separated from the base.
Figure 9:
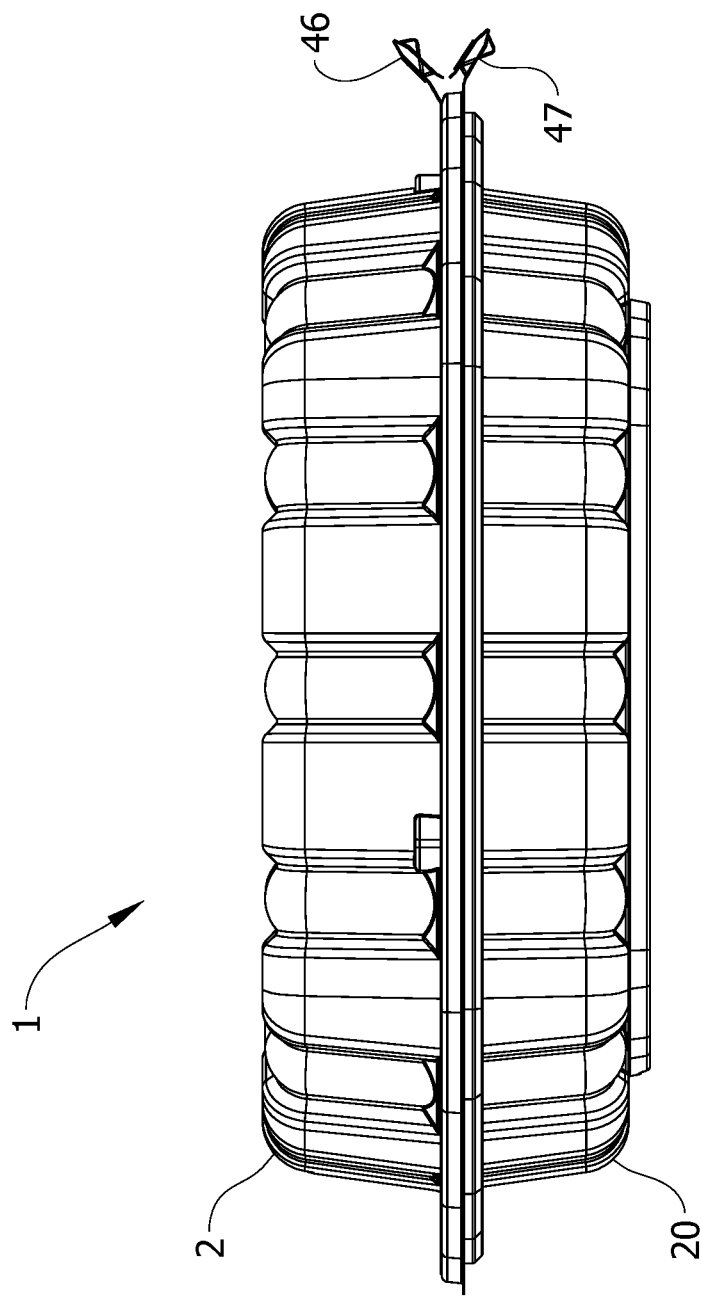
FIG. 9 is a right side elevation view of a preferred embodiment container showing the hinge area structure having been separated into two visible grasping portions that allow the lid to be separated from the base.
Figure 10:
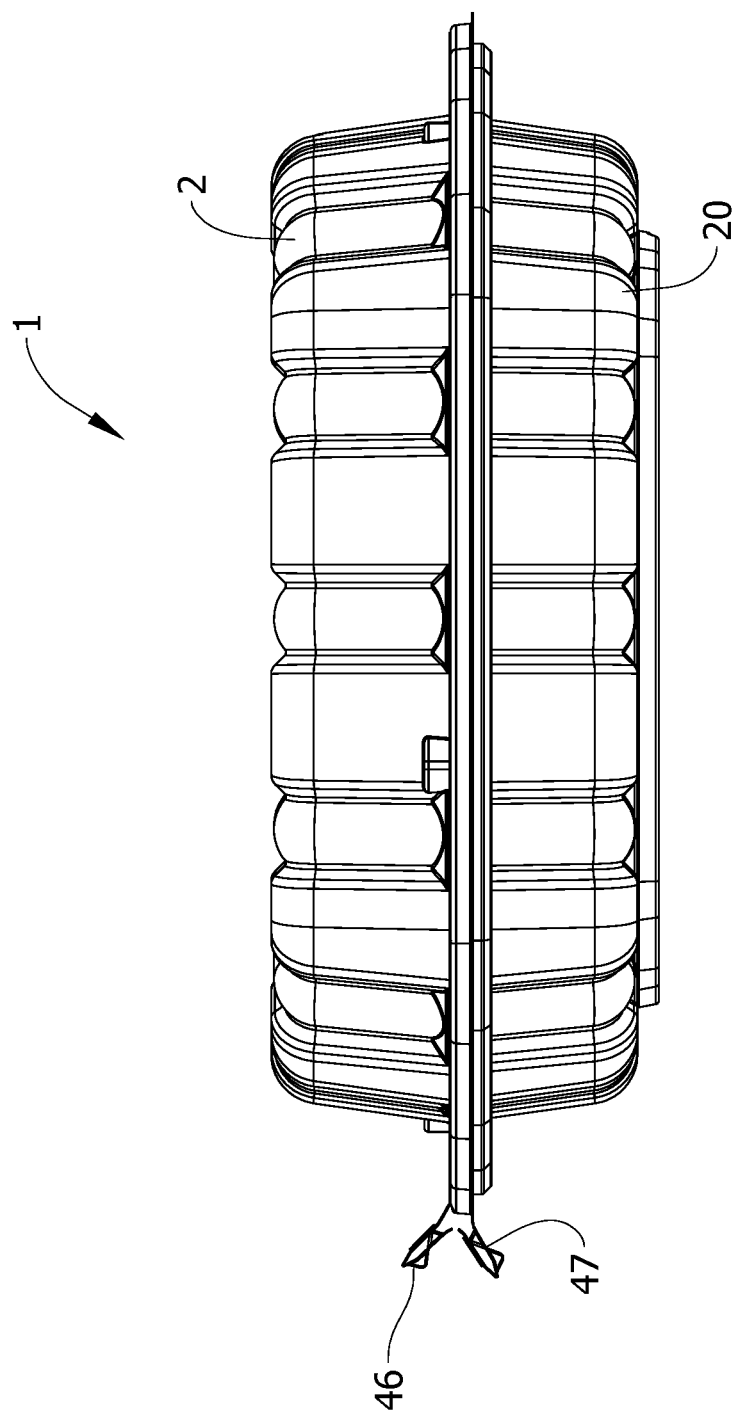
FIG. 10 is a left side elevation view of a preferred embodiment container showing the hinge area structure having been separated into two visible grasping portions that allow the lid to be separated from the base.
Figure 11:
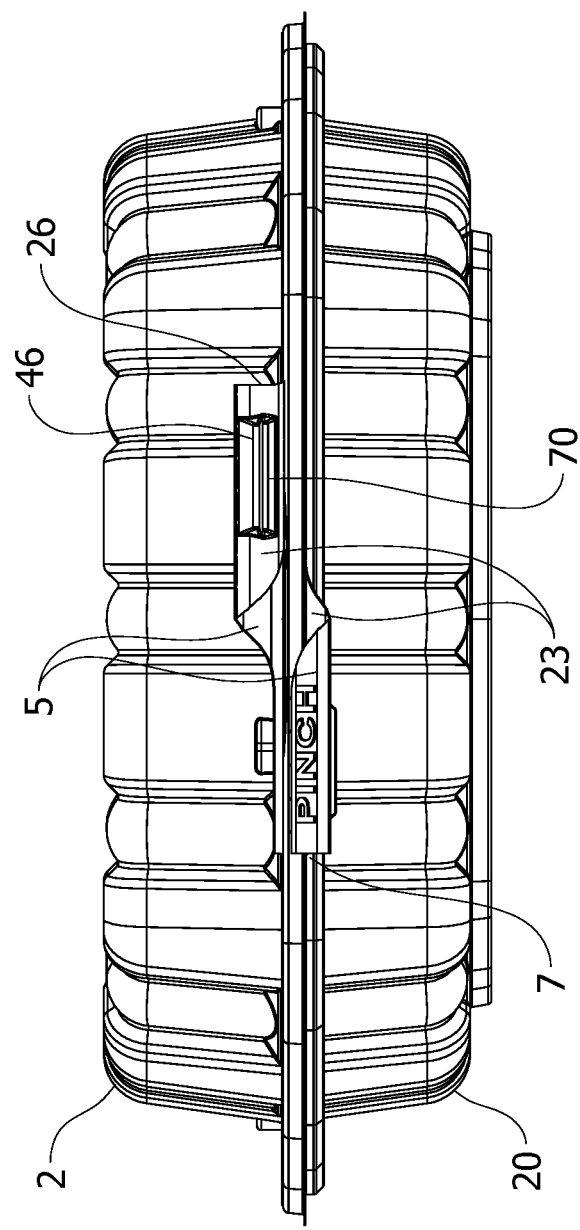
FIG. 11 is a rear elevation view of a preferred embodiment container showing the hinge area structure having been separated into two visible grasping portions that allow the lid to be separated from the base.
Figure 12:
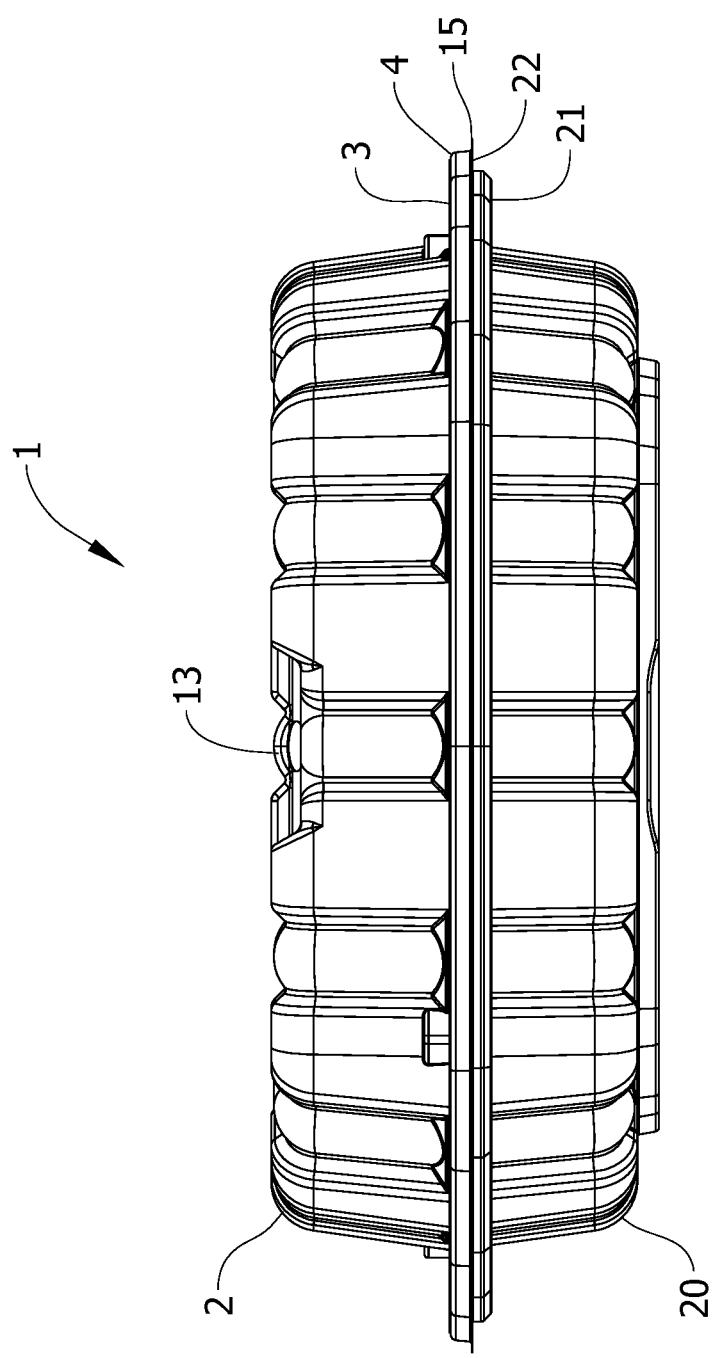
FIG. 12 is a front elevation view of a preferred embodiment container showing the front of the container when the hinge area structure in the rear of the container has been separated into two visible grasping portions that allow the lid to be separated from the base.
Figure 13:
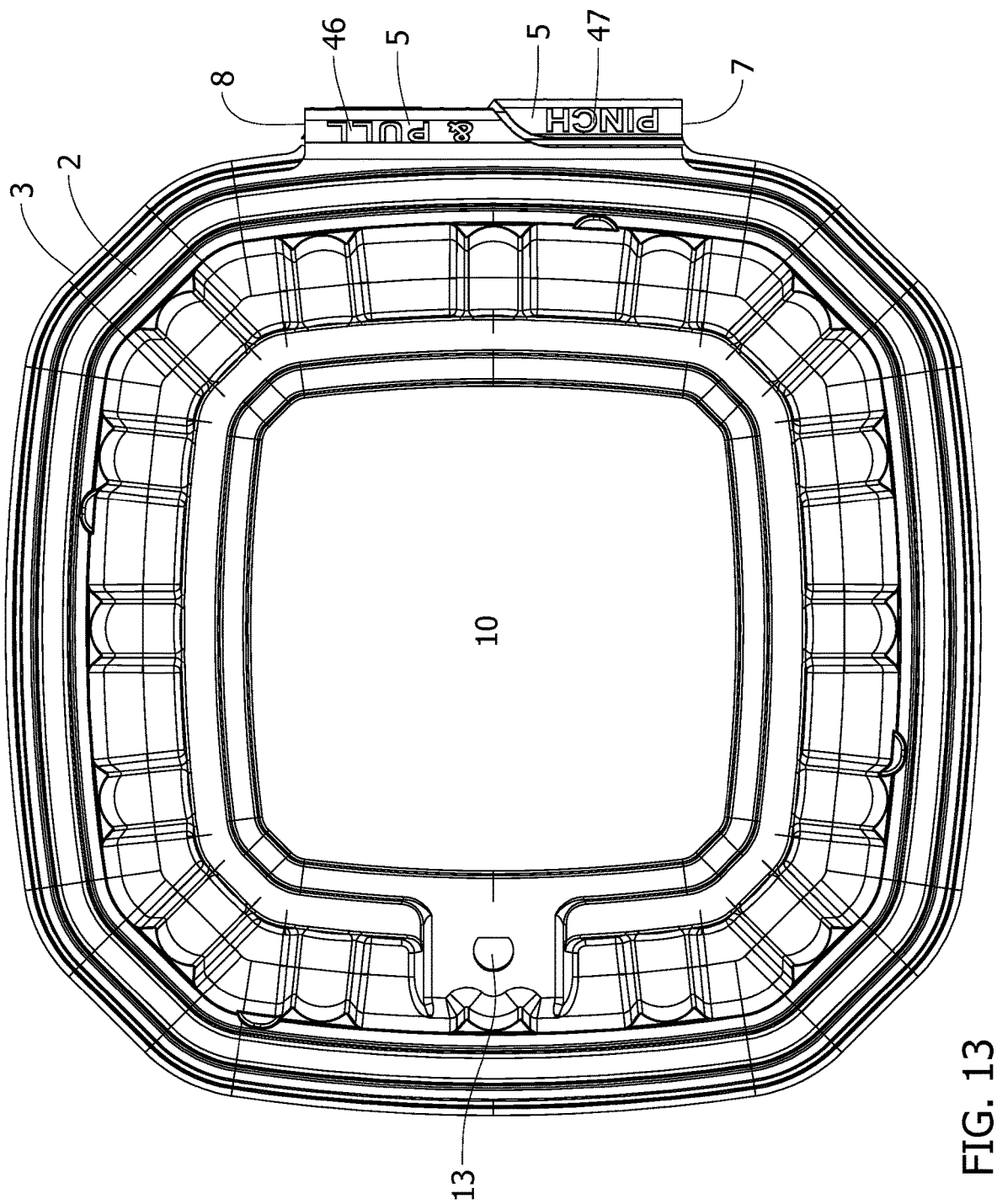
FIG. 13 is a top plan view of a preferred embodiment container showing the hinge area structure having been separated into two visible grasping portions that allow the lid to be separated from the base.
Figure 14:
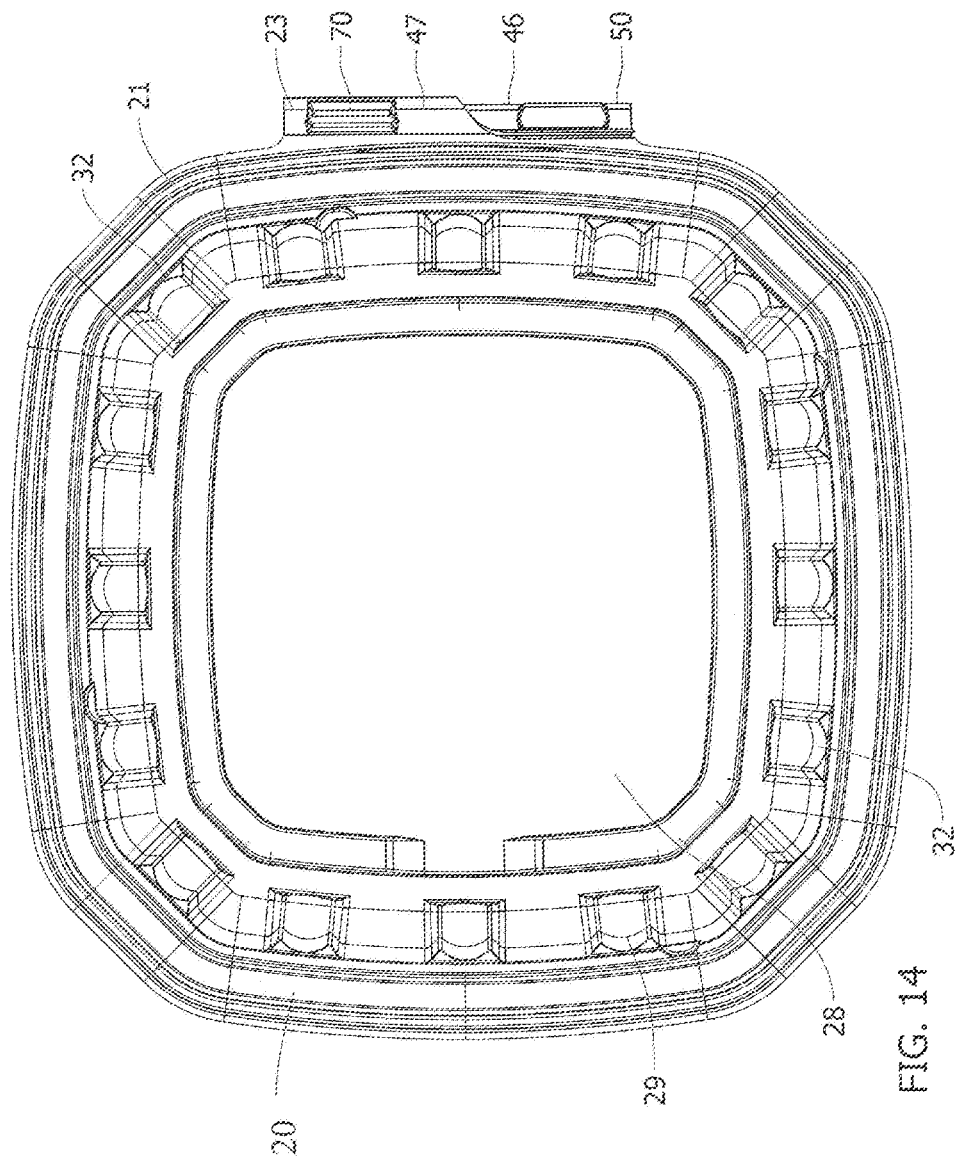
FIG. 14 is a bottom plan view of a preferred embodiment container showing the hinge area structure having been separated into two visible grasping portions that allow the lid to be separated from the base.

Lid 2 and base 20 respectively include lid rim 3 and a base rim 21. As shown in FIG. 7, base 20 has an open upper end 30 defined by base rim 21. Lid rim 3 preferably includes peripherally projecting lid rim flange 6. Base rim 21 similarly preferably includes base rim flange 24. Base 20 and lid 2 connect at hinge 50.

Figure 15:
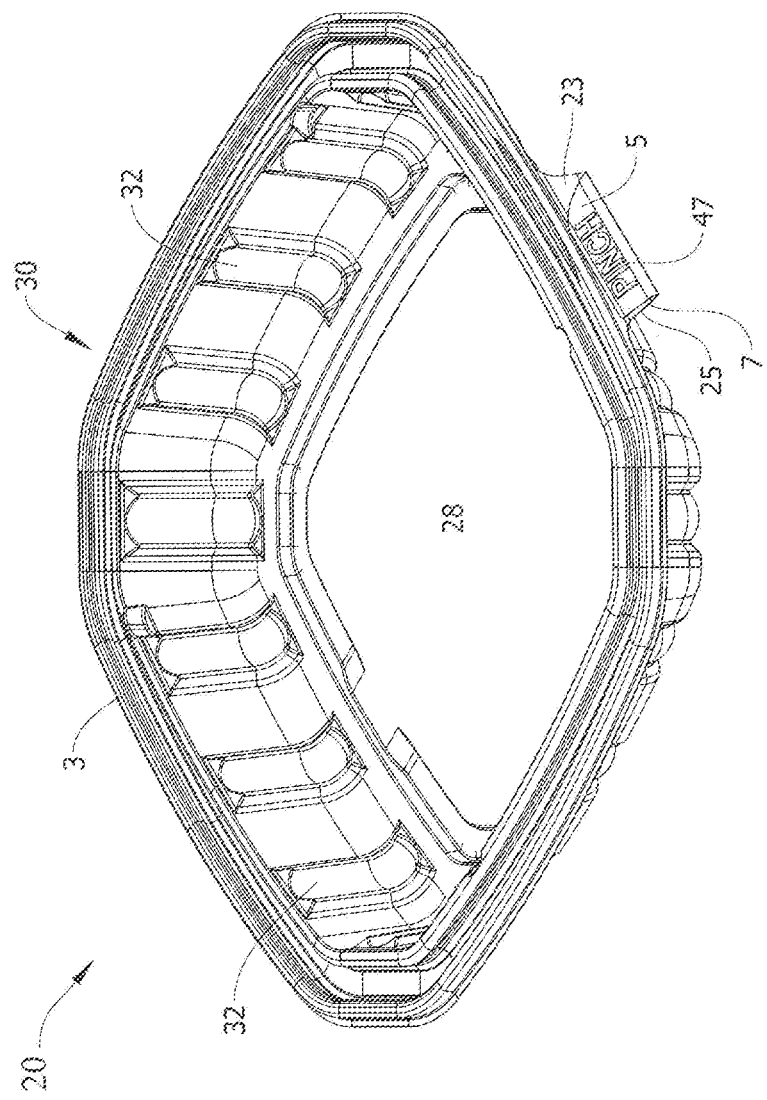
FIG. 15 is a perspective view showing the base of the preferred embodiment container in the opened configuration after the lid has been removed from the base by using the newly created grasping portions formed by rupture of the frangible line to peel the lid from the base.

As shown in the figures, preferred embodiment container 1 is capable of assuming a loading configuration (FIG. 7), an initially sealed configuration (FIGS. 1-6), a closed (unsealed) configuration (FIGS. 8-4) and an opened configuration (FIG. 15). In the loading configuration of FIG. 7, rim 3 of lid 2 and rim 21 of base 20 are not engaged in a friction fit about periphery 15 of container 1. Container 1 is placed in the initially sealed configuration from the loading configuration by closing lid 2 upon base 20 until lid rim 3 is urged into a closing friction fit with base rim 21. In the initially sealed configuration of FIGS. 1-6 lid rim 3 and base rim 21 are frictionally engaged and tamper-evidencing frangible line 34 (discussed infra) is intact. In the closed configuration shown in FIGS. 8-14, frangible line 34 has been ruptured but lid 2 is closed upon base 20 with lid rim 3 and base rim 21 frictionally engaged. In the opened configuration lid 2 is removed from base 20. FIG. 15 depicts base 20 in the manner in which a user would deploy the base to consume a food product contained therein after the lid has been removed from the base.

As is more fully discussed below, container 1 transitions from the initially sealed configuration to the closed configuration by rupturing frangible line 34 on hinge panels 5, 23. The rupture of frangible line 34 allows lid 2 to be peeled from base 20 by pulling lid rim 3 from engagement with base rim 21. Once frangible line is ruptured, lid 2 can be re-closed upon to base 20 and then re-opened without need to break frangible line 34. Thus, container 1, after being opened from the initially sealed state can be re-closed by pressing lid rim 3 into engagement with base rim 21.

Figure 16:
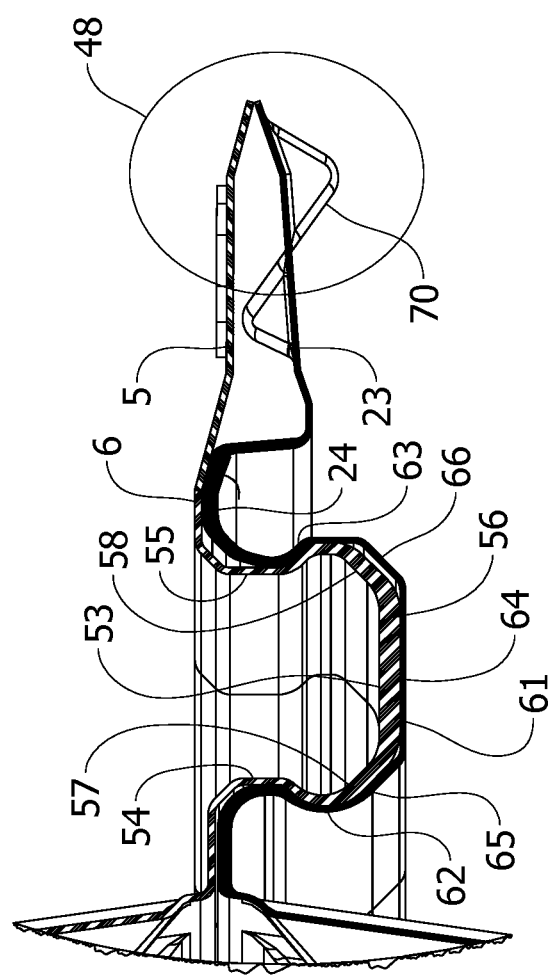
FIG. 16 is a detailed, side elevation section view of the hinge area structure of an initially sealed container that includes the present invention container-opening mechanism, the container having an alternate embodiment rim structure and hinge area structure.

Lid 2 includes top portion 10. Top portion 10 includes exterior surface 11 upon which vent 13 is disposed. Container 1 may include lid sidewall 12 extending between top portion 10 and lid rim 3. Lid rim 3 circumferentially extends about the peripheral portion 4 of lid 2. Base rim 21 similarly extends about the periphery 22 of base 20. FIG. 16 depicts exemplary embodiment rim structural features that make the embodiment container not just tamper evident, but also tamper resistant. For purposes of carrying out the invention, a container need not have the exact rim structure shown in FIG. 16. Other rim structures can be employed, such as is shown in the other figures. According to the suggested embodiment of FIG. 16, rims 3, 21 engage into a sealed or closed configuration. In this respect, container 1 includes engaging rims 3, 21 that provide for a friction fit between them that tightly closes the container and that cannot be easily pulled apart without rupturing the frangible line 34 more fully described. From the aspect of FIG. 16 it is seen that in a preferred embodiment, lid rim 3 includes lid rim bead 53 that comprises a downwardly descending lid rim inner vertical wall 54, an upwardly extending lid rim outer wall 55 and a bead bottom segment 56. Bead bottom segment 56 extends from the bottom 57 of lid rim inner wall 54 and curves into the bottom 58 of the lid rim outer wall 55. Flange 6 preferably extends from outer wall 55 of lid rim 3 to lid hinge panel 5.

Base 20 includes base rim 21 circumferentially extending about the periphery 22 of base 20. Base sidewall 29 extends from floor 28 to rim 21. Base rim 21 includes base rim bead 61 that comprises downwardly extending inner vertical wall 62, upwardly extending outer wall 63 and bead bottom segment 64. Bead bottom segment 64 extends from bottom 65 of downwardly extending inner vertical wall 62 to bottom 66 of the upwardly extending outer wall 63. Flange 24 preferably extends from outer wall 63 of base rim 21 to base hinge panel 23. Downwardly extending inner wall 62 and upwardly extending outer wall 63 each include a concave structure configured to respectively receive and frictionally engage convex surfaces of inner wall 54 and outer wall 55 of lid rim 3 when container 1 is in the sealed or closed arrangement.

In one embodiment the invention is directed to a tamper evident container comprising base 20 and lid 2. Base 20 has base peripheral portion 22 including base rim 21. Lid 2 includes lid peripheral portion 4 that includes lid rim 3. Lid 2 is mountable to base 20 for bringing container 1 into a sealed configuration. The sealed configuration is achieved by engagement of lid rim 3 with base rim 21 with lid 2 overlying base 20. The initially sealed container 1 has a periphery 15 defined by the engaged rims 3, 21 and the folded area 48 encompassing hinge 50.

Container 1 further includes base hinge panel 23 joined to base rim 21 and extending horizontally outwardly therefrom. Lid hinge panel 5 similarly joins to lid rim 3 and extends horizontally outwardly from lid rim 3. Lid hinge panel 5 and base hinge panel 23 have respective first side edges 7, 25 and second side edges 8, 26. Base hinge panel 23 and lid hinge panel 5 join together at hinge 50. Hinge 50 can be formed by any known method of forming hinges and hinge regions in plastic containers including but not limited to scoring, thinning, coining or interrupted perforations. When container 1 is placed in the initially sealed configuration, lid hinge panel 5 overlies base hinge panel 23 as it extends from lid rim flange 6 to hinge 50. Hinge 50 extends from respective first side edges 7, 25 of lid hinge panel 5 and base hinge panel 23 to respective second side edges 8, 26 of lid hinge panel 5 and base hinge panel 23. When in the initially sealed formation, lid hinge panel 5, base hinge panel 23 and hinge 50 collectively form a fold 48 (shown best in FIG. 16 as the circled area). When in the loading configuration, lid hinge panel 5, base hinge panel 23 and hinge 50 collectively form foldable section 49 (shown in FIG. 7).

Figure 6:
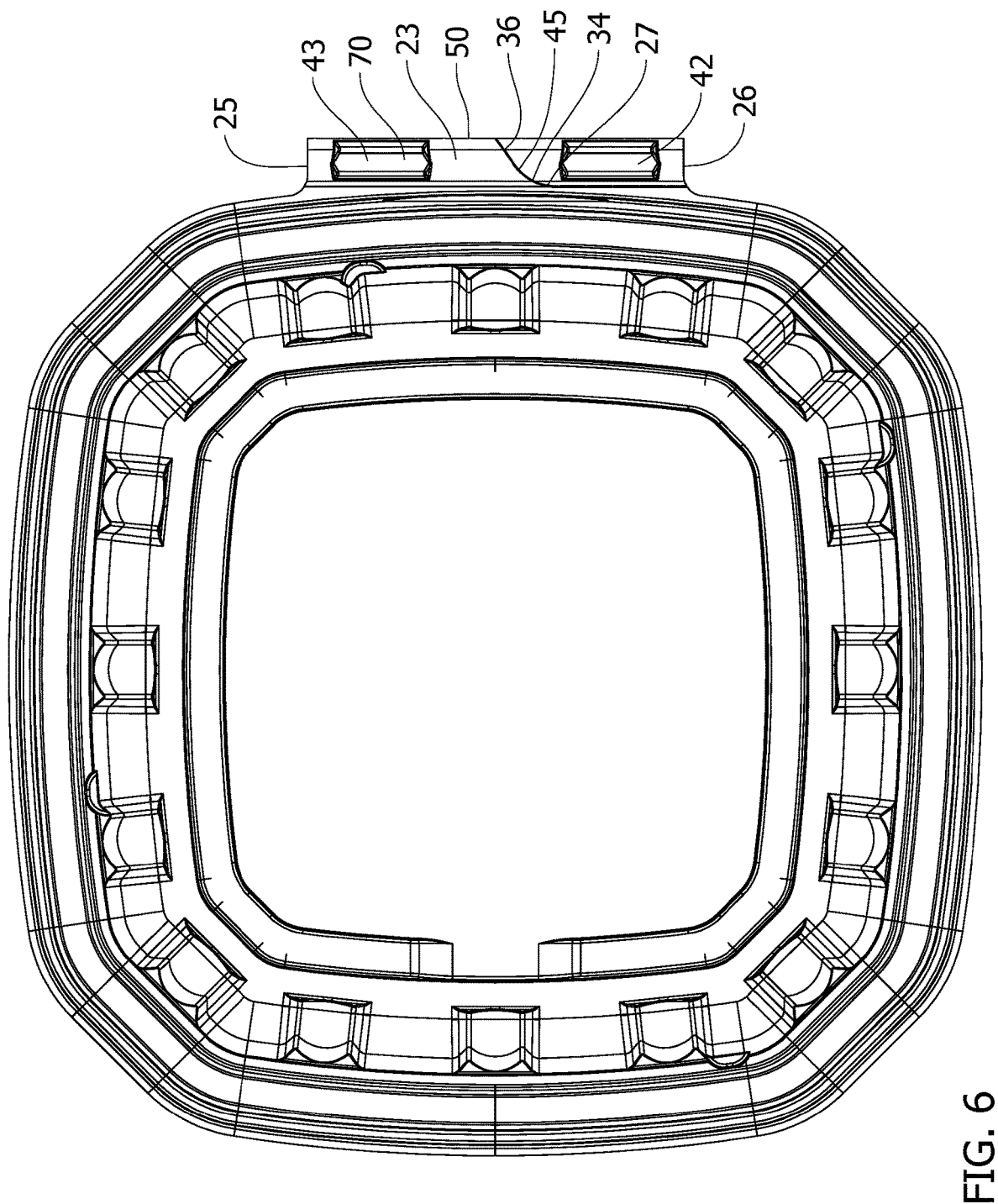
FIG. 6 is a bottom plan view of the preferred embodiment container in the initially sealed configuration.

Embodiment container 1 includes frangible line (a/k/a breakable joint or line of weakness) 34 extending from first side edge 7 of lid hinge panel 5 partially across lid hinge panel 5 to first point 9 on lid hinge panel 5. From first point 9 frangible line extends outwardly (frangible line portion 35) to hinge 50 and then extends down and across hinge 50 and then inwardly (frangible line portion 36) from hinge 50 to second point 27 on base hinge panel 23. From second point 27 frangible line 34 extends partially across base hinge panel 23 to second side edge 26 of base hinge panel 23. By virtue of its outwardly and inwardly directed components 35, 36 frangible line 34 divides fold 48 into adjacent first and second portions or sides 42, 43. In the depicted embodiment and orientation shown in FIG. 5, first side 42 is on the right side of outwardly directed portion 35 of frangible line 34 on hinge panel 5. This is merely exemplary. The attachment of lid hinge panel 5 of first side 42 of fold 48 to lid rim 3 is continuous and not divided from lid rim 3 by frangible line 34. As shown in FIG. 6, base hinge panel 23 of second side 43 of fold 48 is similarly continuously attached to base rim 21 and not divided from base rim 21 by frangible line 34.

Rupturing frangible line 34 is simple and requires no awkward manipulation or positioning of container 1. To break frangible line 34 a user need only grasp with one hand first side 42 of fold 48 and second side 43 of fold 48 with the other hand. Frangible line 34 separates upon application of an upwardly directed force to first side 42 of fold 48 while holding second side 43 in place or directing it downward. Upon frangible line 34 breaking, fold 48 separates into first and second adjacent grasping portions 46, 47. In other words, first side 42 of fold 48 becomes first grasping portion 46 and second side 43 of fold 48 becomes second grasping portion 47. As shown in the figures, a portion of lid hinge panel 5 on first grasping portion 46 remains attached to lid rim 3. Similarly, a portion of base hinge panel 23 on second grasping portion 47 remains attached to base rim 21. To remove lid 2 from base 20 a user need merely peel lid 2 from base 20 by pulling first grasping portion 46 and second grasping portion 47 vertically away from each other.

Further describing the invention, it can be seen that tamper evident container 1 comprises base 20 and lid 2. Base 20 has a base peripheral portion 22 defining an open upper end 30 of base 20. Base peripheral portion 22 includes base rim 21. Lid 2 includes lid peripheral portion 4 that includes lid rim 3. Lid 2 is mountable to base 20 with lid 2 overlying open upper end 30 of base 20 for bringing container 1 to an initially sealed configuration, the initially sealed configuration is effected by interlocking engagement of lid rim 3 with base rim 21 about an entire periphery 15 of container 1. The interlocking engagement is releasable and re-engageable for opening and re-closing container 1.

Base hinge panel 23 extends outwardly from base rim 21. Lid hinge panel 5 extends outwardly from lid rim 2. Lid hinge panel 5 and base hinge panel 23 have respective first side edges 7, 25 and second side edges 8, 26. Hinge 50 pivotally connects base hinge panel 23 and lid hinge panel 5. Base hinge panel 23 extends between base rim 21 and hinge 50. Lid hinge panel 5 extends between lid rim 3 and hinge 50. Hinge 50 extends from first side edges 7, 25 of lid hinge panel 5 and base hinge panel 23 to second side edges 8, 26 of lid hinge panel 5 and base hinge panel 23.

Container 1 further includes frangible line 34 that extends from first side edge 7 of lid hinge panel 5 partially across lid hinge panel 5 to first point 9 on that panel. Frangible line 34 extends from first point 9 outwardly to hinge 50 and then extends across hinge 50 and inwardly from hinge 50 to second point 27 on base hinge panel 23. From second point 27 frangible line extends partially across base hinge panel 23 to second side edge 26 of base hinge panel 23. By virtue of this arrangement when the container is in the initially sealed configuration, only a portion of the frangible line is situated on the lid hinge panel and only a portion of the frangible line is situated on the base hinge panel.

Frangible line 34 separates upon the application of an upwardly directed force to first side 42 of folded lid hinge and base hinge panels 5, 23 (folded on hinge 50) applied relative to second side 43 of the folded lid hinge and base hinge panels 5, 23. As shown in the figures, the severance of frangible line 34 creates first grasping portion 46 that is horizontally adjacent to, but separated from, second grasping portion 47. First grasping portion 46 is attached to lid 2 and second grasping portion 47 is attached to base 20. After rupturing of frangible line 34, base rim 21 and lid rim 3 remain intact and engaged. By pulling first grasping portion 46 vertically away from second grasping portion 47, lid 2 is removed from base 20. Container 1 can be re-closed after frangible line 34 has been ruptured. By way of further description, container 1 in the sealed configuration requires a first separating force to rupture the frangible line. The rupture of frangible line 34 separates lid 2 and base 20 into two distinct pieces frictionally engaged at their peripheral rims 3, 21. After the rupture of line 34, a second separating force is required to disengage the engaged peripheral rims of the lid and base.

Either or both of lid hinge panel 5 or base hinge panel 23 can have knurling, added texture or finger rests to provide the user with additional purchase when holding sides 42, 43 or grasping portions 46, 47. In the depicted embodiment, base hinge panel 23 includes finger rests 70. This is merely an optional feature. Leaving such finger rests off the hinge panels gives the container a cleaner look. Notably, in the initially sealed configuration container 1 has no structures projecting outwardly of the engaged lid and base rims other than the lid hinge panel, the base hinge panel and the hinge. This makes embodiment container appear as a normal container without manifest tamper evident features. Accordingly, container 1 represents a departure from the multitude of tamper evident containers that have projections and complicated structures at the hinge area required for the severance of a frangible component. In addition, neither of hinge panels 5, 23, nor container 1, has any frangible line other than line 34, which characteristic provides for a simple opening mechanism and a minimum of unattractive surface markings and discontinuities. In addition, rupturing frangible line 34 does not create pieces of unattached material, such as strips, that must be disposed.

In the depicted preferred embodiment frangible line 34 includes first arcuate segment 44 located at first point 9 that softly redirects frangible line 34 from a line traveling longitudinally across hinge panel 5 to one that is directed outwardly and proceeds transversely across the long axis of hinge panel 5. This arcuate section allows frangible line 34 to not just change direction, but to do so in smooth fashion so that lid hinge panel 5 does not include any internal corners that can provide any alternate tear points to circumvent the opening mechanism and to ensure that when first side 42 of fold 48 is separated from second side 43 of fold 48, frangible line 34 ruptures smoothly. Further, frangible line 34 extends vertically down across and transects hinge 50. Frangible line 34 preferably includes second arcuate segment 45 at second point 27 on base hinge panel 23 that provides the similar advantages and functionality as first arcuate segment 44.

The invention is further directed to a frangible line for a plastic food container that has a lid hinge panel connected to a lid rim, a base hinge panel connected to a base rim and a hinge connecting the lid hinge panel to the base hinge panel. The inventive frangible line 34 extends from a first side edge 7 of the lid hinge panel to a first point 9 partially across the lid hinge panel. At the first point 9 the frangible line 34 extends outwardly to the hinge 50 and then vertically transects the hinge 50 and then extends inwardly from the hinge to a second point 27 on the base hinge panel. The inventive frangible line extends from the second point to a second side edge on the base hinge panel. The rupture of the frangible line results in the creation of two adjacent grasping portions 46, 47, one attached to the lid rim and one attached to the base rim.

The invention is further directed to a method of thermoforming a tamper evident container. The method comprises forming a lid 2 from a portion of a single sheet of at least partially transparent plastic material. Lid 2 is formed with a lid rim 3 defining a periphery 4 of the lid 2. The lid rim 3 is formed such that it connects with a lid hinge panel 5. In the preferred embodiment method, the lid rim 3 is formed with an outwardly projecting lid rim flange 6 from which the lid hinge panel 5 extends. The method further includes forming a base 20 from a portion of the single sheet. The base 20 includes a base rim 21 defining a periphery 22 of the base 20. Base rim 21 connects with base hinge panel 23. The base rim 21 preferably includes an outwardly projecting base rim flange 24. In the preferred embodiment method base rim 21 is formed with an outwardly projecting base rim flange 24 from which base hinge panel 23 extends. The method includes forming a hinge 50 from a portion of the single sheet, the hinge 50 joins the lid hinge panel 5 to the base hinge panel 23. Foldable section 49 comprises hinge 50, lid hinge panel 5 and base hinge panel 23.

The embodiment method further includes forming a frangible line 34 that extends: a) from a first side edge 7 of lid hinge panel 5 partially across a portion of lid hinge panel 5 to a first point 9; b) from first point 9 to hinge 50; c) at hinge 50 across hinge 50 in a manner that transects hinge 50 and then from hinge 50 to a second point 27 on base hinge panel 23; and e) from second point 27 partially across base hinge panel 23 to a second side edge 26 of base hinge panel 23. Preferably the container is formed such that when the lid is closed upon the base the container has no structures projecting outwardly of the engaged lid and base rims other than the lid hinge panel, the base hinge panel and the hinge. It is also preferable that the container is formed such that none of the lid hinge panel, the base hinge panel or the container have any other frangible line. It can further be seen from the figures, that frangible line 34, other than the small segment of it vertically touching and transecting the hinge into two horizontal portions, is horizontally spaced entirely interiorly of the hinge or hinge axis.

A container constructed in accordance with the present invention can be manufactured in a variety of shapes and sizes, and is preferably formed of resins or plastic materials including, but not limited to, polystyrene, polyethylene, polypropylene, polyvinyl chloride or polyethylene terephthalate ("PET"). The container is preferably thermoformed, but can be blow-molded or injection molded. The container lid and base can be transparent or translucent, and may be colored in either instance. Further, the container is preferably polygonal, but can be of any shape.

Having described the invention in detail, those skilled in the art will appreciate that modifications may be made of the invention without departing from its spirit. Therefore, it is not intended that the scope of the invention be limited to the specific embodiment illustrated and described.

What is claimed is:

1. A container, the container comprising:
   a base and lid:
   the base and lid each having a peripheral rim, the peripheral rims of the base and lid shaped and sized for frictional engagement to place the container in an initially sealed configuration having a vertical axis;
   a lid hinge panel extending from a portion of the lid peripheral rim and a base hinge panel extending from a portion of the base peripheral rim, the lid hinge panel and base hinge panel connecting at a hinge;
   a frangible line that, when the container is in the initially sealed configuration, the frangible line extends: a) from an outside edge of the lid hinge panel only partially across a portion of the lid hinge panel to a first point on the lid hinge panel; b) the frangible line then extends from the first point outwardly to the hinge and then the frangible line extends downwardly across the hinge in a manner that vertically transects the hinge; c) from the hinge the frangible line then extends inwardly on the base hinge panel to a second point on the base hinge panel; and d) the frangible line then extends from the second point only partially across the base hinge panel to an outside edge of the base hinge panel;
   the container in the initially sealed configuration requiring:
   a first separating force to rupture the frangible line, rupture of the frangible line separates the lid and base into two distinct pieces that are frictionally engaged at their peripheral rims; and
   after rupture of the frangible line, a second separating force to disengage the engaged peripheral rims of the lid and base.

2. The container of claim 1 wherein application of the first separating force creates a first grasping portion separated from a second grasping portion.

3. The container of claim 2 wherein the first grasping portion is horizontally adjacent the second grasping portion.

4. The container of claim 2 wherein the first grasping portion is attached to the lid and the second grasping portion is attached to the base.

5. The container of claim 1 wherein in the initially sealed configuration the container has no structures projecting outwardly of the engaged lid and base peripheral rims other than the lid hinge panel, the base hinge panel and the hinge.

6. The container of claim 1 wherein the frangible line is the only frangible line on either the lid hinge panel or the base hinge panel.

7. The container of claim 1 wherein the frangible line is the only frangible line on the container.

8. The container of claim 1 wherein the frangible line includes the first point on the lid hinge panel being on an arcuate segment of the frangible line that redirects the frangible line on the lid hinge panel to change from a longitudinal direction to a lateral direction relative to the lid hinge panel.

9. The container of claim 1 wherein the frangible line includes the second point on the base hinge panel being on an arcuate segment of the frangible line that redirects the frangible line on the base hinge panel to change from a longitudinal direction to a lateral direction relative to the base hinge panel.

10. The container of claim 8 wherein the frangible line includes the second point on the base hinge panel being on an arcuate segment of the frangible line that redirects the frangible line on the base hinge panel to change from a longitudinal direction to a lateral direction relative to the base hinge panel.

11. The container of claim 1 wherein rupturing the frangible line does not create a piece of material detached from the container.

12. A frangible line for a plastic food container, the plastic food container having a lid hinge panel connected to a lid rim, a base hinge panel connected to a base rim and a hinge connecting the lid hinge panel to the base hinge panel, the frangible line comprising:
a first length extending from a first side edge of the lid hinge panel to a first point partially across the lid hinge panel;
a second length extending outwardly from the first point on the lid hinge panel to the hinge and then vertically transecting the hinge and then extending inwardly from the hinge to a second point on the base hinge panel; and
a third length extending from the second point on the base hinge panel to a second side edge on the base hinge panel.

13. The frangible line of claim 12 wherein rupture of the frangible line results in the creation of two adjacent grasping portions, one attached to the lid rim and one attached to the base rim.

14. The container of claim 1 wherein the lid hinge panel extending from the portion of the lid peripheral rim does not extend beyond the hinge; and
the base hinge panel extending from the portion of the base peripheral rim does not extend beyond the hinge.

15. The container of claim 12 wherein the lid hinge panel extends from the lid rim and does not extend beyond the hinge; and
the base hinge panel extends from the base rim and does not extend beyond the hinge.

16. A container comprising:
a base;
a base rim on the base, the base rim extending around a periphery of the base;
a lid;
a lid rim on the lid, the lid rim extending around a periphery of the lid;
a base hinge panel connected to the base rim,
a lid hinge panel connected to the lid rim;
a hinge joining the base hinge panel to the lid hinge panel with the base hinge panel extending from the base rim to the hinge and with the lid hinge panel extending from the lid rim to the hinge;
the base hinge panel, the lid hinge panel and the hinge collectively forming a fold with the base hinge panel and the lid hinge panel laying adjacent;
a frangible line on the base hinge panel and on the lid hinge panel, the frangible line extends across the lid hinge panel away from the lid rim to the hinge, the frangible line then extends across the hinge, and then the frangible line extends across the base hinge panel from the hinge toward the base rim.

17. The container of claim 16, further comprising:
the frangible line divides the fold into adjacent first and second side portions of the fold.

18. The container of claim 17, further comprising:
the frangible line breaks in response to the first side portion of the fold and the second side portion of the fold being moved in opposite directions.

19. The container of claim 18, further comprising:
the frangible line breaks and separates the first side portion from the base while the first side portion remains joined to the lid and separates the second side portion from the lid while the second side portion remains joined to the base.

20. The container of claim 16, further comprising:
the base hinge panel having opposite first and second side edges of the base hinge panel;
the lid hinge panel having opposite first and second side edges of the lid hinge panel;
the frangible line extends from the first side edge of the lid hinge panel across the lid hinge panel and away from the lid rim to the hinge, the frangible line then extends across the hinge, the frangible line then extends from the hinge across the base hinge panel toward the base rim and then extends to the second side edge of the base hinge panel.

* * * * *